United States Patent [19]  [11] 4,018,740
Kruglikov et al.  [45] Apr. 19, 1977

[54] METHOD OF PRODUCING WATER-SOLUBLE AMINE-MODIFIED UREA-FORMALDEHYDE RESINS MODIFIED WITH POLYOXYALKYLENE ETHER

[76] Inventors: Anatoly Abramovich Kruglikov, ulitsa Vyazovskaya, 9, kv. 9; Lia Ilinichna Aronova, ulitsa Karla Marxa, 87, kv. 5; Vladimir Vasilievich Kuftarev, ulitsa Tsiolkovskogo, 3, kv. 9; Zoya Sergeevna Sevrjugina, ulitsa Pervomaiskaya, 74, kv. 25, all of Nizhny Tagil Sverdlovskoi oblasti; Vera Konstantinovna Eletskaya, poselok "Pravdy", ulitsa Zhdanova, 21, kv. 41, Moskovskaya oblast, all of U.S.S.R.

[22] Filed: June 28, 1976

[21] Appl. No.: 700,149

[52] U.S. Cl. .................. 260/70 A; 260/29.4 R; 260/70 R; 260/70 M; 260/849
[51] Int. Cl.² .................. C08G 14/02; C08L 61/20
[58] Field of Search ........... 260/70 R, 70 A, 70 M, 260/29.4 R, 849

[56] References Cited
UNITED STATES PATENTS

| 2,854,437 | 9/1958 | Polansky et al. ........... 260/70 A |
| 3,030,324 | 4/1962 | Booty ........................ 260/29.4 |
| 3,310,416 | 3/1967 | Schibler .................... 260/70 A X |
| 3,489,718 | 1/1970 | Goullon et al. ............ 260/70 A |
| 3,645,973 | 2/1972 | Schibler .................... 260/70 A X |
| 3,836,605 | 9/1974 | Ricker et al. .............. 260/849 |
| 3,839,291 | 10/1974 | Avis ........................ 260/70 R |
| 3,883,462 | 5/1975 | Pearson .................... 260/29.4 R |
| 3,966,665 | 6/1976 | Sakata et al. .............. 260/849 X |

OTHER PUBLICATIONS
Chem. Abs. 67:P74748e; 71:P62449e.

Primary Examiner—Murray Tillman
Assistant Examiner—T. DeBenedictis, Sr.

[57] ABSTRACT

A method of producing water-soluble urea-formaldehyde resins modified with aliphatic polyamines, residing in that 1 mole of urea, 1.5–3.0 moles of formaldehyde, and branched aliphatic polyamines with molecular weight 200–440, containing 10–16 wt.% of tertiary nitrogen, are reacted at 80–100° C and pH of an alkaline medium 7.2–9.5 attained by the proper amount of polyamines. Aromatic or aliphatic sulphonic acids of the general formula $R-SO_3H$, where R is aryl or alkyl, are introduced into the obtained mixture until pH of an acid medium 4.8–6.0 is attained. Then an alkaline agent is added up to pH 7.2–9.5. As a result an oligomer is formed which is reacted with polyoxyethylene ether or isooctylphenol with 7–11 oxyethylene units at 100–105° C. The ethers are taken in amount of 0.2–2.0 wt. parts per 100 wt. parts of the initial urea.

The proposed method of producing urea-formaldehyde resins modified with aliphatic polyamines ensures the production of resins which, being used in paper industry, completely replace colophony in manufacturing offset paper. They increase the surface strength of the paper and decrease dusting and picking.

The method is simple in technology and can be performed both as a continuous and batch process.

10 Claims, No Drawings

METHOD OF PRODUCING WATER-SOLUBLE AMINE-MODIFIED UREA-FORMALDEHYDE RESINS MODIFIED WITH POLYOXYALKYLENE ETHER

The present invention relates to producing of water-soluble urea-formaldehyde resins modified with aliphatic polyamines.

These resins are used in paper industry for improving the quality of paper, in particular, for manufacturing paper with increased strength in the wet state.

An important technological problem is producing the resins of this type able to replace colophony in manufacturing offset paper, to increase the surface strength of the paper, as well as to decrease dusting and picking.

Offset paper manufactured at present is obtained by introducing colophony into the paper mass which is a scarce material because of limited resources. Besides, colophony does not dissolve in water, which complicates its uniform distribution in a paper mass. Offset paper obtained with the use of colophony is characterized by dusting and picking.

Known in the art are methods of producing urea-formaldehyde resins modified with aliphatic polyamines, residing in that the products of urea-formaldehyde condensation are modified with low-molecular aliphatic polyamines of linear structure. The resins find application in paper industry for increasing paper wet-strength.

Known in the art is a method of producing water-soluble urea-formaldehyde resins by modifying the products of urea-formaldehyde polycondensation with polyamines of the general formula $H_2N(-C_nH_{2n}-NH-)_xH$, where $x$ is 2 or 3, for example, diethylenetriamine or triethylenetetramine, at 80°–100° C. The resins thus obtained increase the wet-strength of the paper. But they cannot be used for manufacturing offset paper instead of colophony. In addition, they neither increase the surface strength, nor decrease dusting and picking.

Likewise known in the art is a method of producing water-soluble urea-formaldehyde resins modified with polyamines. According to the method, the products of urea-formaldehyde condensation are modified with alkylenediamine, for instance, ethylenediamine at pH 5.0–6.5. The resins obtained are applied for producing paper with increased strength in a wet state. However, they cannot be used for manufacturing offset paper; the resins neither increase the surface strength, nor decrease dusting and picking.

Also known in the art is a method residing in that urea-formaldehyde oligomer is modified with polyalkylenepolyamines of linear structures, for example, diethylenetriamine, triethylenetetramine, or tetraethylenepentamine at 85°–100° C with subsequent precipitation and separation of the high-molecular part of the resin. Precipitation is performed by cooling the oligomer obtained down to 10° C.

The resins obtained by the known method increase the strength of the paper in a wet state but cannot be used for manufacturing offset paper. They neither enhance the surface strength, nor decrease dusting and picking.

The known methods of producing water-soluble urea-formaldehyde resins modified with aliphatic polyamines are disadvantageous in that the resins obtained have limited application. Thus, their application in paper industry is confined to manufacturing wet-strong paper. They cannot be used instead of colophony in production of offset paper. The resins neither increase the surface strength nor reduce dusting and picking.

It is an object of the invention to provide a method of producing water-soluble urea-formaldehyde resins modified with aliphatic polyamines which will yield resins with properties ensuring the replacement of colophony in offset paper production, an increase of the surface strength of the paper, a reduction of dusting and picking.

In accordance with this and other objects, the invention consists in that a method is proposed involving an interaction of urea, formaldehyde, and aliphatic polyamines at 80°–100° C and pH varying in the process of said interaction. According to the invention, as aliphatic polyamines use is made of branched aliphatic polyamines with molecular weight 200–400 and with a content of tertiary nitrogen 10–16 wt.%. The process of interacting urea with formaldehyde in a mole ratio 1:1.5–3.0, respectively, and branched aliphatic polyamines is run first in an alkaline medium at pH 7.2–9.5 which is provided by the amount of polyamines, then in acid medium at pH 4.8–6.0 which is ensured by the introduction of aromatic or aliphatic sulphonic acids of the general formula R-SO$_3$H, where R is aryl or alkyl, and then again in an alkaline medium at pH 7.2–9.5 attained by the introduction of an alkaline agent, with the formation of oligomer which is interacted at 100°–105° C with polyoxyethylene ether of isooctylphenol, having 7–11 oxyethylene units, by adding the latter to oligomer in an amount 0.2–2.0 wt. parts per 100 wt. parts of the initial urea.

Modifiers used according to the invention are characterized by the following parameters:

| | | |
|---|---|---|
| 1. | Content of nitrogen with an acid | — no less than 16.7 wt.%; |
| 2. | Total content of nitrogen by Kjeldahl's method | — no less than 28 wt.%; |
| 3. | Clorine content | — no more than 0.2 wt.%; |
| 4. | Fractional composition of vacuum distillation at 10 mm Hg: | |
| | a) fraction boiling below 75° C | — no more than 1 wt.%; |
| | b) fraction boiling in the range of 75–210° C | — no more than 15 wt.%; |
| | c) bottoms boiling above 210° C | — no less than 85 wt.%; |
| 5. | Content of tertiary nitrogen | — 10–16 wt.%; |
| 6. | Molecular weight | — 200–440. |

Urea, formaldehyde, and aliphatic polyamines are interacted at a mole ratio of urea to formaldehyde equal to 1:1.5–3.0. Aliphatic polyamines are introduced in amounts ensuring the interaction conducted in an alkaline medium at pH 7.2–9.5. The chosen temperature range allows for the process of condensation of the reacting components. The further condensation is conducted in an acid medium at pH 4.8–6.0 which is attained due to the introduction of aromatic or aliphatic sulphonic acids of the general formula R-SO$_3$H, where R is aryl or alkyl. The obtained product is neutralized with an alkaline agent to pH 7.2–9.5. Any known alkaline agent can be used as an alkaline agent, sodium hydroxide being the most suitable one. As the result of the above-cited operations, oligomer is obtained which is further treated with polyoxyethylene ethers of isooctylphenol at 100°–105° C. As the ethers, in the present invention use is made of polyoxyethylene ethers of isooctylphenol with 7–11 oxythylene units. Polyoxyethylene ethers of isooctylphenol are introduced in amounts of 0.2–2.0 wt. parts per 100 wt. parts of the urea.

The set of the above operations, in particular, the performance of polycondensation under the conditions of varying pH of the medium (alkaline-acid-alkaline) within the chosen range, as well as the use of branched aliphatic polyamines and polyoxyethylene ethers of isooctylphenol, ensures the end product with the desired properties.

It is preferable to carry out condensation first with a mole ratio of urea to formaldehyde equal to 2.2–2.4 at pH 7.5–9.0 and 96°–100° C.

In an acid medium it is desirable to run condensation over the pH range 5.0–5.5, which is attained by introduction of aromatic or aliphatic sulphonic acids of the general formula $R-SO_3H$, where R is aryl or alkyl, and 96°–100° C.

It is desirable to neutralize the reaction product after condensation in an acid medium with sodium hydroxide to pH 8.8–9.3.

Upon condensation in an acid medium, it is more preferable to use, as an aromatic sulphoacid, benzenesulphonic acid which favours the process and is the most available and wide-spread compound of this class. However, other sulphonic acids, such as toluenesulphonic acid, xylenesulphonic acid, naphtalenesulphonic acid, and salicylsulphonic acid can also be successfully used.

As aliphatic sulphonic acid, it is preferable to use butylsulphonic acid or sulphonic obtained by sulphonation of paraffinic hydrocarons.

Polyoxyethylene ethers of isooctylphenol with 9–10 oxyethylene units are the most preferable for additional condensation of oligomer with polyoxyethylene ethers of isooctylphenol.

In order to obtain the most suitable product for the offset paper production, it is recommendable, before polyoxyethylene ethers of isooctylphenol are added to oligomer, to concentrate the latter in vacuum at 550–650 mm Hg till the refractive index 1.456–1.458.

The resins obtained in accordance with the proposed invention have the following properties.

In appearance, they are a homogeneous transparent liquid. The resins are unlimitedly soluble in water. Upon addition of any amount of water to the resin, a homogeneous transparent solution is formed. Neither resin coagulation, nor turbidity of the solution indicative of the separation of a solid phase from the solution, is observed.

The content of dry substance in the resins obtained in accordance with the proposed invention exceeds 40 wt. %. pH of the resins is within the range of 7.5–9.0; the content of free formaldehyde varies from 3.0 to 4.0 wt.%.

The viscosity of the resins determined by the flow time from viscometer with the nozzle diameter 5.4 mm at 20° C is within the range 10–40 sec. The time during which the solution of resin becomes turbid upon the addition of alumina is less than 3 minutes.

The resins obtained according to the proposed invention are stable for more than three months which is sufficient for long distance transporting, storage, and further application.

Offset paper manufactured by known method on the basis of sulphate bleached pulp with introduction of the proposed resin into the paper mass in amounts 30 kg/t, under the conditions of complete elimination of colophony, fully meets the modern requirements imposed upon the paper of this type. It is characterized by the absence of picking and considerably lower dusting as compared to common offset paper. General and printing properties of this paper are as follows:

| General Properties | |
|---|---|
| 1. Mass of 1 m² | — 120±4 g; |
| 2. Volume mass | — 0.75–0.80 g/cm³; |
| 3. Breakage length on an average in 2 directions | — 2.500–2.700 m; |
| 4. Fracture (number of double folds) in transverse direction | — 9–12; |
| 5. Whiteness | — 83–88%; |
| 6. Ash content | — 10–14%; |
| 7. Smoothness | — 30–80 sec.; |
| 8. Deformation in transverse direction after wetting in water for 30 minutes | — 1.7–2.0%; |
| Printing Properties | |
| 1. Picking | — none |
| 2. Dusting | — negligible |
| 3. Saturation of impression (visually) | — higher than in group 4. |

Thus, the proposed method provides resins which, in contrast to the known ones, allow complete obviation of the use of colophony in manufacturing offset paper, increase the surface strength of the paper, decrease dusting and picking.

The method is also advantageous in that it can be performed both as a batch and continuous process, the latter being more preferable.

The method is simple in technology and is accomplished as follows.

Batch process of producing modified urea-formaldehyde resins is carried out by the following scheme.

Formalin is put into a reactor of conventional type fitted with a reflux condenser, a stirrer, and a steam jacket. pH is adjusted to the required value by addition of polyamines, after which urea is introduced. The mixture obtained is heated up to 80°–100° C at constant stirring over a required period of time. Condensation is conducted under these conditions first in an alkaline and then in an acid medium which is attained by putting aromatic or aliphatic sulphonic acids into the reactor. Further condensation is run in the presence of an alkaline agent which ensures the required pH of the medium. As a result, oligomer is formed to which polyoxyethylene ethers of isooctylphenol are added, and the condensation process is continued at the required temperature until the end product is formed. It is expedient to concentrate oligomer in vacuum prior to condensation with polyoxyethylene ethers of isooctylphenol.

Continuous process is accomplished in the following way. The reaction mixture with the required ratio between urea, formaldehyde, and branched aliphatic polyamines is fed continuously at a constant rate to a first reactor equipped with a reflux condenser, a stirrer, and a steam jacket. In this reactor condensation takes place in an alkaline medium under constant stirring and heating. The obtained product is delivered continuously through a hydroseal to a second reactor equipped in the same way as the first one. In the second reactor, where an aromatic or aliphatic sulphonic acid is fed also continuously, condensation takes place in an acid medium under constant stirring and heating. After the second reactor the product is delivered through a hydroseal to an evaporator operating continuously. Into the evaporator the required amount of an alkali is also added and at the same time oligomer is concentrated, and condensate being removed continuously through a barometric tube. The concentrated oligomer is fed continuously to a third reactor equipped in the same way as the first and the second ones. In the third reactor an additional condensation of oligomer is performed, polyoxyethylene ether of isooctylphenol being supplied continuously. The end product goes continuously into a tubular heat exchanger through a hydroseal, where it is cooled down and then prepacked for storage.

The process of producing resins by the proposed invention can easily be automated.

For a better understanding of the present invention specific examples are given hereinbelow by way of illustration.

In the given examples an alkaline agent and aromatic or aliphatic sulphonic acids are used in the form of aqueous solutions.

EXAMPLE 1

324 wt. parts of 37% formalin and 2 wt. parts of branched aliphatic polyamines are put into a metal reactor equipped with a condenser, stirrer, steam-water jacket, and vacuum collector. The polyamines are characterized by the following parameters:

| | |
|---|---|
| 1. Content of nitrogen titrated with an acid | — 20.9 wt.%; |
| 2. Total content of nitrogen by Kjeldahl's method | — 34.8 wt.%; |
| 3. Chlorine content | — 0.12 wt.%; |
| 4. Fractional composition of vacuum distillation at 10 mm Hg: | |
| a) fraction boiling below 75° C | — 0.3 wt.%; |
| b) fraction boililing in the range of 75–210° C | — 11.2 wt.%; |
| c) bottoms boiling above 210° C | — 88.5 wt.%; |
| 5. Content of tertiary nitrogen | — 13.9 wt.%; |
| 6. Average moleculer weight | — 398. |

After introduction of polyamines pH is 8.8. Then 100 wt. parts of urea are put into the reactor. When urea is dissolved upon stirring, steam is fed into the jacket and the mixture is heated up to boiling for 40 minutes. At 96°–97° C the mixture is stirred for 45 minutes.

At the end of alkaline condensation pH of the medium is 7.5. After that benzenesulphonic acid in the form of a 0.25 N solution is added to the reactor until pH 5.5 is attained. In an acid medium condensation is run at 96°–97° C for 30 minutes. Next, 4% solution of sodium hydroxide is introduced to pH 8.8. The reaction mixture is cooled down to 65° C and oligomer is concentrated at 65°–70° C in vacuum at 550–650 mm Hg. The concentration is stopped when the refractive index becomes 1.456; 0.5 wt. parts of polyoxyethylene ether of isooctylphenol with an average number of oxyethylene units equal to 10 is put into the reactor. An additional condensation of oligomer with polyoxyethylene ether of isooctylphenol is performed at 100°–105° C for 15 minutes, after which the resin is cooled down to 40° C and discharged into containers.

The resin obtained has the following characteristics:

| | |
|---|---|
| 1. Content of dry residue | — 63.2%; |
| 2. Miscibility with water | — unlimited; |
| 3. Conditional viscosity at 20±1° C | — 17 sec.; |
| 4. pH | — 9.0; |
| 5. Content of free formaldehyde | — 3.7 wt.%; |
| 6. Time during which the resin solution becomes turbid after addition of alumina | — 2.6 minutes. |

Offset paper manufactured on the basis of the sulphite bleached cellulose by known method with introduction of said resin into a paper mass in amounts of 30 kg/t under condition of complete elimination of colophony is characterized by the following parameters:

| | |
|---|---|
| 1. Mass of 1 m² | — 120 g; |
| 2. Volume mass | — 0.85 g/cm³; |
| 3. Breakage length on an average in 2 directions | — 2.500 m; |
| 4. Fracture (the number of double folds) in transverse direction | — 12; |
| 5. Whiteness | — 85; |
| 6. Ash content | — 14%; |
| 7. Smoothness | — 80 sec.; |
| 8. Deformation in transverse direction after wetting in water for 30 minutes | — 1.9%; |
| 9. Picking | — absent |
| 10. Dusting | — absent; |
| 11. Saturation of impression | — more than in group 4. |

EXAMPLE 2

406 wt. parts of 37% formalin and 2 wt. parts of branched polyamines are put into a metal reactor fitted with a condenser, a stirrer, a steam-water jacket, and a vacuum collector. The polyamines are characterized by the following parameters:

| | |
|---|---|
| 1. Content of nitrogen titrated with an acid | — 16.8 wt.%; |
| 2. Total content of nitrogen by Kjeldahl's method | — 28.1 wt.%; |
| 3. Chlorine content | — 0.14 wt.%; |
| 4. Fractional composition of vacuum distillation at 10 mm Hg: | |
| a) fraction boiling below 75° C | — 0.4 wt.%; |
| b) fraction boiling in the range of 75–210° C | — 11.5 wt.%; |
| c) bottoms boiling above 210° C | — 88.wt.%; |
| 5. Content of tertiary nitrogen | — 11.7 wt.%; |
| 6. Average molecular weight | — 224. |

After introduction of polyamines pH is 8.7. Then 100 wt. parts of urea are put into the reactor. After urea is dissolved upon stirring, steam is fed into the jacket and the mixture is heated up to boiling for 40 minutes. At 96°–97° C the mixture is stirred for 45 minutes. At the end of alkaline condensation pH of the medium is 7.4. After that benzenesulphonic acid in the form of a 0.25 N solution is added to the reactor until pH 5.0 is attained. In an acid medium condensation is run at 96°–97° C for 30 minutes. Next, 4% solution of sodium hydroxide is introduced up to pH 8.9. The reaction mixture is cooled down to 65° C and oligomer is concentrated at 65°–70° C in vacuum at 550–650 mm Hg. The concentrating is stopped when the refractive index is 1.456; 0.2 wt. parts of polyoxyethylene ether of isooctylphenol with an average number of oxyethylene units equal to 7 is put into the reactor. An additional condensation of oligomer with polyoxyethylene ether of isooctylphenol is performed at 100°–105° C. for 15 minutes, after which the resin is cooled down to 40° C and discharged into containers.

The resin obtained has the following characteristics:

| | | |
|---|---|---|
| 1. Content of dry residue | — | 63.2%; |
| 2. Miscibility with water | — | unlimited; |
| 3. Conditional viscosity at 20±1° C | — | 18 sec; |
| 4. pH | — | 8.3; |
| 5. Content of free formaldehyde | — | 3.1 wt.%; |
| 6. Time during which the resin solution becomes turbid after addition of alumina | — | 2.5 minutes. |

Offset paper manufactured on the basis of sulphite bleached cellulose by the known method with introduction of said resin into a paper mass in amounts of 30 kg/t under conditions of complete elimination of colophony is characterized by the following parameters:

| | | |
|---|---|---|
| 1. Mass of 1 m² | — | 122 g |
| 2. Volume mass | — | 0.80 g/cm³; |
| 3. Breakage length on an average in 2 directions | — | 2500 m; |
| 4. Fracture (number of double folds) in transverse direction | — | 11; |
| 5. Whiteness | — | 84%; |
| 6. Ash content | — | 10%; |
| 7. Smoothness | — | 30 sec.; |
| 8. Deformation in transverse direction after wetting in water for 30 minutes | — | 1.8%; |
| 9. Picking | — | absent; |
| 10. Dusting | — | absent; |
| 11. Saturation of impression | — | more than in group 4. |

EXAMPLE 3

203 wt. parts of 37% formalin and 1.9 wt. parts of branched polyamines are put into a metal reactor fitted with a condenser, a stirrer, a steam-water jacket, and a vacuum collector. The polyamines are characterized by the following parameters:

| | | |
|---|---|---|
| 1. Content of nitrogen titrated with an acid | — | 17.7 wt.%; |
| 2. Total content of nitrogen by Kjeldahl's method | — | 24.8 wt.%; |
| 3. Chlorine content | — | 0.19 wt.%; |
| 4. Fractional composition of vacuum distillation at 10 mm Hg: | | |
| a) fraction boiling below 75° C | — | 0.6 wt% |
| b) raction boiling in the range of 75–210° C | — | 11.6 wt.%; |
| c) bottoms boiling above 210° C | — | 87.4 wt.%; |
| 5. Content of tertiary nitrogen | — | 12.6 wt.%; |
| 6. Average molecular weight | — | 301. |

After introduction of polyamines pH is 9.0. Then 100 wt. parts of urea are put into the reactor. After urea is dissolved upon stirring, steam is fed into the jacket and the mixture is heated up to 80° C. for 40 minutes. At 80°–81° C the mixture is stirred for 45 minutes. At the end of alkaline condensation pH of the medium is 7.8. After that benzenesulphonic acid in the form of a 0.25 N solution is added into the reactor until pH 5.3 is attained. In an acid medium condensation is carried out at 80°–81° C for 30 minutes. Next, 4% solution of sodium hydroxide is introduced up to pH 7.2. 2.0 wt. parts of polyoxyethylene ether of isooctylphenol with an average number of oxyethylene units equal to 11 are put into the reactor. An additional condensation of oligomer with polyoxyethylene ether of isooctylphenol is performed at 100°–105° C for 15 minutes, after which the resin is cooled down to 40° C and discharged into containers.

The obtained resin has the following characteristics:

| | | |
|---|---|---|
| 1. Content of dry residue | — | 40.0 wt.%; |
| 2. Miscibility with water | — | unlimited |
| 3. Conditional viscosity at 20±1° C | — | 10 sec.; |
| 4. pH | — | 8.1 |
| 5. Content of free formaldehyde | — | 4.0 wt.%; |
| 6. Time during which the resin solution becomes turbid after addition of alumina | — | 2.6 minutes. |

Offset paper manufactured on the basis of sulphite bleached cellulose by the known method with introduction of said resin into a paper mass in amounts of 30 kg/t under conditions of complete elimination of colophony is characterized by the following parameters:

| | | |
|---|---|---|
| 1. Mass of 1 m² | — | 119 g; |
| 2. Volume mass | — | 0.84 g/cm³; |
| 3. Breakage length on an average in 2 directions | — | 2500 m; |
| 4. Fracture (number of double folds) in transverse direction | — | 12; |
| 5. Whiteness | — | 83%; |
| 6. Ash content | — | 11% |
| 7. Smoothness | — | 50 sec.; |
| 8. Deformation in transverse direction after wetting in water for 30 minutes | — | 1.7%; |
| 9. Picking | — | absent; |
| 10. Dusting | — | small; |
| 11. Saturation of impression | — | more than in group 4. |

EXAMPLE 4

298 weight parts of 37% formalin and 2 wt. parts of branched aliphatic polyamines are put into a metal reactor fitted with a condenser, a stirrer, a steam-water jacket, and a vacuum collector. The polyamines have the following parameters:

| | | |
|---|---|---|
| 1. Content of nitrogen titrated with an acid | — | 18.2 wt.%; |
| 2. Total content of nitrogen by Kjeldahl's method | — | 31.7 wt.%; |
| 3. Chlorine content | — | 0.17 wt.%; |
| 4. Fractional composition of vacuum distillation at 10 mm Hg: | | |
| a) fraction boiling below 75° C | — | 0.8 Wt.%; |
| b) fraction boiling in the range of 75–210° C | — | 12.4 wt.%; |
| c) bottoms boiling above 210° C | — | 85.1 wt.%; |
| 5. Content of tertiary nitrogen | — | 10.0 wt.% |
| 6. Average molecular weight | — | 200. |

After introduction of polyamines pH is 8.5. Then 100 wt. parts of urea are put into the reactor. After urea is dissolved upon stirring, steam is fed into the jacket and the mixture is heated up to boiling for 35 minutes. At 99°–100° C the mixture is stirred for 45 minutes. At the end of alkaline condensation pH of the medium is 7.2. After that benzenesulphonic acid in the form of a 0.25 N solution is added into the reactor until pH 5.1 is attained. In an acid medium condensation is carried out at 99°–100° C for 30 minutes. Next, 4% solution of sodium hydroxide is introduced up to pH 8.8. The reaction mass is cooled down to 65° C and oligomer is concentrated at 65°–70° C in vacuum at 550–650 mm Hg. The process is controlled by the refractive index. When it equals 1.456 concentration is stopped and 0.5 wt. parts of polyoxyethylene ether of isooctylphenol with an average number of oxyethylene units equal to 10 is introduced into the reactor. An additional condensation of oligomer with polyoxyethylene ether of isooctylphenol is performed at 100°–105° C for 15 minutes, after which the resin is cooled down and discharged into containers.

The obtained resin has the following characteristics:

| | | |
|---|---|---|
| 1. Content of dry residue | — | 64.1 wt.%; |
| 2. Miscibility with water | — | unlimited |
| 3. Conditional viscosity at 20±1° C | — | 15 sec; |
| 4. pH | — | 7.5; |
| 5. Content of free formaldehyde | — | 3.5 wt.%; |
| 6. Time during which the resin solution becomes turbid after addition of alumina | — | 2.9 minutes. |

Offset paper manufactured by the known method on the basis of sulphite bleached cellulose with introduction of said resin into the paper mass in amounts of 30 kg/t under conditions of complete elimination of colophony is characterized by the following parameters:

| | | |
|---|---|---|
| 1. Mass of 1 m² | — | 121 g; |
| 2. Volume mass | — | 0.75 g/cm³; |
| 3. Breakage length on an average in 2 directions | — | 2600 m; |
| 4. Fracture (the number of double folds) in transverse direction | — | 9; |
| 5. Whiteness | — | 88%; |
| 6. Ash content | — | 10%; |
| 7. Smoothness | — | 40 sec.; |
| 8. Deformation in transverse direction after wetting in water for 30 minutes | — | 1.7%; |
| 9. Picking | — | absent; |
| 10. Dusting | — | small; |
| 11. Saturation of impression | — | more than in group 4. |

EXAMPLE 5

324 wt. parts of 37% formalin and 2.1 wt. parts of branched aliphatic polyamines are put into a metal reactor fitted with a condenser, a stirrer, a steam-water jacket, and a vacuum collector. The polyamines have the following parameters:

| | | |
|---|---|---|
| 1. Content of nitrogen titrated with an acid | — | 18.4 wt.%; |
| 2. Total content of nitrogen by Kjeldahl's method | — | 30.4 wt.%; |
| 3. Chlorine content | — | 0.16 wt.%; |
| 4. Fractional composition of vacuum distillation at 10 mm Hg: | | |
| a) fraction boiling below 75° C | — | 0.9 wt.%; |
| b) fraction boiling in the range of 75–210° C | — | 14.9 wt.%; |
| c) bottoms boiling above 210° C | — | 88.1 wt.%; |
| 5. Content of tertiary nitrogen | — | 16.0 wt.%; |
| 6. Average molecular weight | — | 440. |

After introduction of polyamines pH is 9.5. Then, 100 wt. parts of urea are introduced into the reactor. After urea is dissolved upon stirring, steam is fed into the jacket and the mixture is heated up to boiling for 35 minutes. At 99°–100° C the mixture is stirred for 45 minutes. At the end of alkaline condensation pH is 7.9. After that benzenesulphonic acid is introduced into the reactor in the form of a 0.25 N solution until pH 5.2 is attained. In an acid medium condensation is run at 99°–100° C for 30 minutes. Then 4% solution of sodium hydroxide is put into the reactor up to pH 9.5. The reaction mixture is cooled down to 65° C and oligomer is concentrated at 65°–70° C in vacuum at 550–650 mm Hg. Concentrating is stopped when the refractive index is 1.458, after which 0.5 wt. parts of polyoxyethylene ether of isooctylphenol with an average number of oxyethylene units equal to 10 is added. An additional condensation of oligomer with polyoxyethylene ether of isoctylphenol is performed at 100°–105° C for 15 minutes.

The resin obtained is characterized by the following parameters:

| | | |
|---|---|---|
| 1. Content of dry residue | — | 63.7 wt.%; |
| 2. Miscibility with water | — | unlimited; |
| 3. Conditional viscosity at 20±1° C | — | 14 sec.; |
| 4. pH | — | 7.9; |
| 5. Content of free formaldehyde | — | 3.6 wt.%; |
| 6. Time during which the resin solution becomes turbid after addition of alumina | — | 2.8 minutes. |

Offset paper manufactured by the known method on the basis of sulphite bleached cellulose with introduction of said resin into the paper mass in amounts of 30 kg/t under the conditions of complete elimination of colophony is characterized by the following parameters:

| | | |
|---|---|---|
| 1. Mass of 1 m² | — | 121 g; |
| 2. Volume mass | — | 0.79 g/cm³; |
| 3. Breakage length on an average in 2 directions | — | 2600 m; |
| 4. Fracture (number of double folds) in transverse direction | — | 12; |
| 5. Whiteness | — | 87%; |
| 6. Ash content | — | 12%; |
| 7. Smoothness | — | 80 sec.; |
| 8. Deformation in transverse direction after wetting in water for 30 minutes | — | 2.0%; |
| 9. Picking | — | absent; |
| 10. Dusting | — | small; |
| 11. Saturaion of impression | — | more than in group 4. |

EXAMPLE 6

The process is run by following the procedure described in Example 1, but instead of polyoxyethylene ether of isooctylphenol with an average number of oxyethylene units equal to 10, a similar ether with 9 oxyethylene units is used.

The resin obtained is characterized by the following parameters:

| | | |
|---|---|---|
| 1. Content of dry residue | — | 62.1 wt.%; |
| 2. Miscibility with water | — | unlimited; |
| 3. Conditional viscosity at 20 ± 1° C | — | 10 sec.; |
| 4. pH | — | 7.7; |
| 5. Content of free formaldehyde | — | 3.8 wt.%; |
| 6. Time during which the resin solution | | | becomes turbid after addition of alumina — 2.9 minutes.

Offset paper manufactured by the known method on the basis of sulphite bleached cellulose with introduction of said resin into a paper mass in amounts of 30 kg/t under conditions of complete elimination of colophony is characterized by the following parameters:

1. Mass of 1 m² — 124 g;
2. Volume mass — 0.83 g/cm³;
3. Breakage length on an average in 2 directions — 2600 m;
4. Fracture (number of double folds) in transverse direction — 11;
5. Whiteness — 86%;
6. Ash content — 11%;
7. Smoothness — 30 sec.;
8. Deformation in transverse direction after wetting in water for 30 minutes — 1.9%;
9. Picking — absent;
10. Dusting — small;
11. Saturation of impression — more than in group 4.

EXAMPLE 7

The process is run by following the procedure described in Example 1, but instead of benzenesulphonic acid, butylsulphonic acid is used which is introduced until pH 6.0 is reached.

The resin obtained has the following characteristics:

1. Content of dry residue — 63.8 wt.%;
2. Miscibility with water — unlimited;
3. Conditional viscosity at 20 ± 1° C — 17 sec.;
4. pH — 8.2;
5. Content of free formaldehyde — 3.9 wt.%;
6. Time during which the resin solution becomes turbid after addition of alumina — 2.6 minutes.

Offset paper manufactured by the known method on the basis of sulphite bleached cellulose with introduction of said resin into a paper mass in amounts 30 kg/t under conditions of complete elimination of colophony is characterized by the following parameters 1. Mass of 1m² — 116 g;
2. Volume mass — 0.81 g/cm³
3. Breakage length on an average in 2 directions — 2600 m;
4. Fracture (number of double folds) in transverse direction — 11;
5. Ehizrnrdd — 85%;
6. Ash content — 11%;
7. Smoothness — 40 sec.;
8. Deformation in transverse direction after wetting in water for 30 minutes — 1.8%;
9. Picking — absent;
10. Dusting — absent;
11. Saturation of impression — more than in group 4.

EXAMPLE 8

The process is run by following the procedure described in Example 1, but instead of benzenesulphonic acid, salicylsulphonic acid is used which is introduced until pH 4.8 is reached.

The resin obtained has the following parameters:

1. Content of dry residue — 60.0 wt.%;
2. Miscibility with water — unlimited;
3. Conditional viscosity at 20 ± 1° C — 18 sec.;
4. pH — 8.3;
5. Content of free formaldehyde — 3.7 wt.%;
6. Time during which the resin solution becomes turbid after addition of alumina — 2.4 minutes.

Offset paper manufactured by the known method on the basis of sulphite bleached cellulose with introduction of said resin into a paper mass in amounts of 30 kg/t under conditions of complete elimination of colophony is characterized with the following parameters:

1. Mass of 1 m² — 117 g;
2. Volume mass — 0.82 g/cm³;
3. Breakage length on an average in 2 directions — 2600 m;
4. Fracture (number of double folds) in transverse direction — 10;
5. Whiteness — 83%;
6. Ash content — 12%;
7. Smoothness — 60 sec.;
8. Deformation in transverse direction after wetting in water for 30 minutes — 1.7%;
9. Picking — absent;
10. Dusting — small;
11. Saturation of impression — more than in group 4.

EXAMPLE 9

The process is run by following the procedure described in Example 1, but instead of benzenesulphonic acid, a mixture of sulphonic acids is used obtained by sulphonating a mixture of paraffinic hydrocarbons with an average molecular weight of 250.

The resin obtained has the following characteristics:

1. Content of dry residue — 61.2 wt.%;
2. Miscibility with water — unlimited;
3. Conditional viscosity at 20 ± 1° C — 40 sec.;
4. pH — 8.4;
5. Content of free formaldehyde — 3.8 wt.%;
6. Time during which the resin solution becomes turbid after addition of alumina — 2.5 minutes.

Offset paper manufactured by known method on the basis of sulphite bleached cellulose with introduction of said resin into a paper mass in amounts of 30 kg/t under conditions of complete elimination of colophony is characterized by the following parameters:

1. Mass of 1 m² — 119 g;
2. Volume mass — 0.83 kg/cm³;
3. Breakage length on an average in 2 directions — 2700 m;
4. Fracture (number of double folds) in transverse direction — 11;
5. Whiteness — 84%;
6. Ash content — 10%;
7. Smoothness — 50 sec.;
8. Deformation in transverse direction after wetting in water for 30 minutes — 1.7%;

| 9. Picking | — absent; |
| 10. Dusting | — small; |
| 11. Saturation of impression | — more than in group 4. |

EXAMPLE 10

The present example is given for illustrating a continuous process of producing water-soluble urea-formaldehyde resins modified with aliphatic polyamines.

A reaction mixture containing 324 wt. parts of 37% formalin per 100 wt. parts of urea at pH 8.8, preliminary reached by using 2 wt. parts of branched aliphatic polyamines described in Example 1, is fed continuously into a first reactor, equipped with a reflux condenser, a stirrer, and a stem jacket, at a rate which ensures the residence time of the mass in the reactor equal to 45 minutes. The temperature in the first reactor is maintained within the range of 96°–97° C. The condensation product obtained in the first reactor goes through a hydroseal into a second reactor equipped in the same way as the first one. 0.25 N solution of benzenesulphonic acid in an amount ensuring pH of the product equal to 5.2 is added into the second reactor. The temperature in the second reactor is 96°–97° C. The residence time of the product in the second reactor is 30 minutes. The product from the second reactor is fed continuously to an evaporator operating continuously where concentrating of oligomer takes place in vacuum at 550 mm Hg until the refractive index 1.457 is reached. pH of the product in the evaporator is kept equal to 8.8 by continuous feeding of 40% solution of sodium hydroxide. The condensate is discharged continuously from the evaporator through a barometric tube while the concentrated oligomer is delivered continuously to a third reactor equipped as the first and the second ones. In the third reactor an additional condensation of oligomer with a polyoxyethylene ether of isooctylphenol, with an average number of oxyethylene units equal to 10, is performed, said ether being fed continuously. The residence time of the product in the third reactor is 15 minutes. From the third reactor the resin goes continuously through a hydroseal into a tubeular heat exchanger where it is cooled down to 40° C and then discharged into containers for storing. The resin obtained is characterized by the following parameters:

| 1. Content of dry residue | — 63.7 wt.%; |
| 2. Miscibility with water | — unlimited; |
| 3. Conditional viscosity at 20±1° C | — 20 sec.; |
| 4. pH | — 7.5; |
| 5. Content of free formaldehyde | — 3.6 wt.%; |
| 6. Time during which the resin solution becomes turbid after addition of alumina | — 2.7 minutes. |

Offset paper manufactured by the known method on the basis of sulphite bleached cellulose with introduction of said resin into a paper mass in amounts 30 kg/t under conditions of complete elimination of colophony has the following properties:

| 1. Mass of 1 m² | — 120 g; |
| 2. Volume mass | — 0.84 g/cm³; |
| 3. Breakage length on an average in 2 directions | — 2700 m; |
| 4. Fracture (number of double folds) in transverse direction | — 12; |
| 5. Whiteness | — 88%; |
| 7. Smoothness | — 40 sec.; |
| 8. Deformation in transverse direction after wetting in water for 30 minutes | — 1.8%; |
| 9. Picking | — none |
| 10. Dusting | — none; |
| 11. Saturation of impression | — more than in group 4. |

What is claimed is:

1. A method of producing water-soluble urea-formaldehyde resins modified with aliphatic polyamines, residing in that interaction is performed of 1 mole of urea. 1.5–3.0 moles of formaldehyde, and branched aliphatic polyamines, with molecular weight of 200–440 and the content of tertiary nitrogen 10–15 wt.%, at 80°–100° C and pH of the alkaline medium 7.2–9.5, which is attained by proper amounts of polyamines; a sulphonic acid selected from the group consisting of aromatic and aliphatic sulphonic acids of the general formula $R—SO_3H$, where R is a radical selected from the group consisting of aryls and alkyls, is introduced into the obtained mixture until pH of an acid medium equal to 4.8–6.0 is attained; an alkaline agent is added up to pH of an alkaline medium 7.2–9.5 with the formation of oligomer; said oligomer is interacted with polyoxyethylene ether of isooctylphenol, which has 7–11 oxyethylene units, at 100°–105° C and is introduced in amounts of 0.2–2.0 wt. parts per 100 wt. parts of the initial urea.

2. A method as claimed in claim 1, wherein urea and formaldehyde are used in the mole ratio 1:2.2–2.4 respectively.

3. A method as claimed in claim 1, wherein branched aliphatic polyamines are introduced in amounts ensuring pH of the alkaline medium equal to 7.5–9.0.

4. A method as claimed in claim 1, wherein sulphonic acids selected from the group consisting of aromatic and aliphatic sulphonic acids are introduced in amounts ensuring pH of an acid medium 5–5.5.

5. A method as claimed in claim 1, wherein an alkaline agent is added in amounts ensuring pH of the medium 8.8–9.3.

6. A method as claimed in claim 1, wherein as aromatic sulphonic acids use is made of sulphonic acids selected from the group consisting of benzenesulphonic acid, toluenesulphonic acid, xylenesulphonic acid, naphtalenesulphonic acid, and salicylsulphonic acid.

7. A method is claimed in claim 1, wherein as aliphatic sulphonic acids use is made of sulphonic acids selected from the group consisting of butylsulphonic acid and sulphonic acids obtained by sulphonating hydrocarbons of paraffinic series.

8. A method as claimed in claim 1, wherein as polyoxyethylene ethers of isooctylphenol use is made of polyoxyethylene ethers of isooctylphenol with 9–10 oxyethylene units.

9. A method as claimed in claim 1, wherein, prior to adding polyoxyethylene ether of isooctylphenol to oligomer, the latter is concentrated in vacuum at 550–650 mm Hg.

10. A method as claimed in claim 9, wherein oligomer is concentrated until the refractive index 1.456–1.458 is attained.

* * * * *